United States Patent [19]

Salvucci

[11] Patent Number: 5,145,311
[45] Date of Patent: Sep. 8, 1992

[54] CYLINDRICAL TANK LIFT WITH FOUR WHEELS FOR MOBILITY AND STABILITY

[75] Inventor: Frank S. Salvucci, Pearland, Tex.
[73] Assignee: Anthony Welded Products, Inc., Calif.
[21] Appl. No.: 611,770
[22] Filed: Nov. 13, 1990
[51] Int. Cl.$^5$ .............................................. B65G 9/00
[52] U.S. Cl. ................................... 414/592; 414/618; 414/910; 414/345; 414/347; 254/2 R; 187/9 R
[58] Field of Search ............ 212/166, 199, 182, 184, 212/244, 254, 262; 414/426, 427, 564, 572, 589, 592, 618–619, 629–631, 737, 910–911, 607, 627, 345, 347, 622; 254/2 R, 12–13, 8; 280/5.22, 47.18; 187/9 R, 9 E

[56] References Cited

U.S. PATENT DOCUMENTS

| | | | |
|---|---|---|---|
| 1,416,958 | 5/1922 | Kelley et al. | 414/427 |
| 1,861,191 | 5/1932 | Russel | 212/254 |
| 2,250,577 | 7/1941 | Ernst | 414/622 |
| 2,558,535 | 6/1951 | Billings | 254/2 |
| 2,635,775 | 4/1953 | Ernst | 414/622 |
| 2,730,257 | 1/1956 | Stresali, Jr. | 414/618 |
| 2,878,622 | 3/1959 | Isolio | 414/737 |
| 2,905,347 | 9/1959 | Hoppfeld | 414/622 |
| 3,521,860 | 7/1970 | Zehrung, Jr. et al. | 254/8 |
| 3,587,892 | 6/1971 | Vermette | 414/620 |
| 3,682,342 | 8/1972 | Evans | 254/2 R |
| 4,290,618 | 9/1981 | Morton | 280/5.22 |
| 4,536,123 | 8/1985 | Snyder | 414/448 |
| 4,641,795 | 2/1987 | Honegger | 414/619 |
| 4,669,703 | 6/1987 | Hawkins et al. | 254/8 |
| 4,940,381 | 7/1990 | Rysewyk | 414/607 |

FOREIGN PATENT DOCUMENTS

| | | | |
|---|---|---|---|
| 3443163 | 4/1986 | Fed. Rep. of Germany | 414/911 |
| 2585688 | 2/1987 | France | 414/627 |
| 1386538 | 4/1988 | U.S.S.R. | 414/620 |
| 2077223 | 12/1981 | United Kingdom | 254/2 R |

Primary Examiner—Jesus D. Sotelo
Assistant Examiner—Stephen P. Avila
Attorney, Agent, or Firm—Antonio M. Fernandez

[57] ABSTRACT

A lift for raising and lowering large cylindrical tanks, which when filled with a fluid such as liquid nitrogen are very heavy, is provided with a base consisting of two parallel beams, each with a wheel at each end and a cross beam closer to one pair of wheels than the other to leave a U-shaped part of the base that may be positioned around a tank. An upright telescoping beam has a horizontal rod at its upper end that engages an eye on a strap welded to the tank. When the upright telescoping beam is extended by a jack having one end on a seat secured to a hollow beam and the other end secured to the telescoping beam, the cylinder is raised in a nearly vertical position. Side struts aid in supporting the upright hollow beam, and each side strut supports a bumper rod that prevents the tank from dragging on the upright hollow beam. Pulleys with V-belts are positioned on the bumper rods to prevent the tank from dragging on the bumper rods. In addition, or alternatively, the pulleys with V-belts may be provided on the upright hollow beam for preventing the tank from dragging on the upright hollow beam.

4 Claims, 3 Drawing Sheets

CYLINDRICAL TANK LIFT WITH FOUR WHEELS FOR MOBILITY AND STABILITY

BACKGROUND OF THE INVENTION

The invention relates to a lift for raising and moving large cylindrical tanks, and more particularly to a four-wheel hand truck having a jack for raising a cylindrical tank and holding the tank off the floor while it is being moved, or placing the raised tank on a dolly or cart.

Large cylindrical tanks for industrial fluids, such as liquid nitrogen, have been extensively used for transporting such fluids from a storage plant to the user's premises. To minimize transportation costs per unit volume of fluid, the cylindrical tanks have become quite large, e.g., 23" in diameter and 52.5" high standing upright. Fixtures, namely valves and gauges on a domed upper end, are protected by a metal ring affixed to the domed upper end by at least two welded metal straps, each having a hole that serves as an eye to receive a hook from an overhead hoist at the storage plant.

Once filled with fluid, the cylindrical tank is delivered to the user's receiving dock. The problem then is for the user to move the tank to a location where the fluid is to be used over a period of days or weeks, and then move the empty tank back to the dock for return to the storage plant.

A two-wheel hand truck for moving such large cylindrical tanks is difficult and dangerous to use, particularly when the tank is full, due to the sheer size of the tank, and because of the large ratio of the tank height to the wheel base of the two-wheel hand truck. If the load on the hand truck starts to fall off to one side for any reason, the high center of gravity directly over the center of the wheel axle quickly shifts beyond the end of the axle. Once that occurs, the operator of the two-wheel hand truck is unable to stop the load from toppling. Righting the load on the hand truck is then virtually impossible, particularly if the tank is full of a fluid. To succeed in righting the load on the hand truck, it is usually necessary to unstrap the tank and then right it on the floor, after which it is again placed on the hand truck by tilting it forward, sliding a toe plate of the truck under it, and then, after strapping it back on the hand truck, tilting the hand truck rearwardly on its wheels.

A further problem with a large tank is placing it on a dolly or cart. A solution to this further problem is proposed in U.S. Pat. No. 4,536,123 which uses a jack to operate an assembly of linkages hinged at the corners to form two parallelograms that are joined to operate together. One side of each parallelogram is affixed to the main upright frame of the hand truck while the opposite side of the parallelogram is strapped to the tank at its upper end. A jack positioned between the upright main frame and the upper pair of parallel sides of the two joined parallelograms will pivot that upper pair of parallel sides upwardly, thereby raising the tank. A pair of forwardly diverging legs rigidly attached to the main upright frame near the bottom prevents it from tilting forward while the tank is being raised in this manner. Once raised, the tank is tilted rearwardly on the truck wheels in the usual manner in order to transport the tank to a desired location while balancing the weight on the two wheels of the truck. The tank thus raised is even more likely to topple to one side because the center of gravity has been raised. The pair of diverging legs will not assist in preventing this toppling because, while the hand truck is being operated to transport the tank, the legs remain off the floor.

SUMMARY OF THE INVENTION

An object of the invention is to provide a stable lift with four wheels for raising and/or transporting a cylindrical tank.

In accordance with the present invention, an H-shaped base having a wheel at each end of two parallel beams has a cross beam closer to one pair of wheels than to the other, thus leaving a U-shaped part of the base having right-angled corners, and short lengths of the two parallel beams extending rearwardly from the cross beam, i.e., extending from the cross beam in a direction away from the open end of the U-shaped part of the base.

An upright hollow beam secured at the center of the cross beam has a telescoping beam inserted into it. A jack (mechanical or hydraulic) has one end secured to a seat affixed to the upright hollow beam and the other end secured to a plate affixed to the telescoping beam. Operating the jack will thus extend and retract the telescoping beam. At the top of the telescoping beam there is a horizontal rod protruding in a vertical plane parallel to the arms of the U-shaped part of the base. When the lift is wheeled to a position next to a cylindrical tank standing on the floor (or on a dolly) with the arms of the U-shaped part of the base straddling the cylindrical tank, the protruding rod is threaded through the eye of a strap secured at or near the edge of the domed top of the cylindrical tank. The horizontally protruding rod is bent upwardly, or is provided with an upwardly extending nib at the end of the rod, in order to prevent the cylinder from slipping off of the rod. Extending the jack thus raises the cylindrical tank by lifting it from the strap that is welded onto it to support a ring that protects valves and gauges on the domed top.

In order that the cylindrical tank ride up smoothly without its base dragging on the upright hollow beam, struts are provided extending horizontally from the upright beam a short distance out and then vertically down to the arms of the U-shaped part of the wheeled base. The struts have mounted on them bumper rods extending out in vertical planes approximately bisecting the right angles between the parallel beams and the cross beam of the base. So that the cylindrical tank will not then drag on the bumper rods, pulleys are mounted on the rods with V-belts around the pulleys. As the tank is raised or lowered, it rests against the V-belts which move with the tank, all the while turning the pulleys. One set of pulleys with V-belts can also be mounted on the upright box beam, one on each side of the box beam with the pulleys and V-belts protruding toward the open end of the U-shaped part of the wheeled base. These pulleys with V-belts on the upright beam function in the same way as the pulleys with V-belts on the bumper rods.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 is an isometric view from the front of the lift shown in FIG. 1.

FIG. 4 is an isometric view from the rear of the lift shown in FIG. 1.

DESCRIPTION OF PREFERRED EMBODIMENTS

Figure 1:
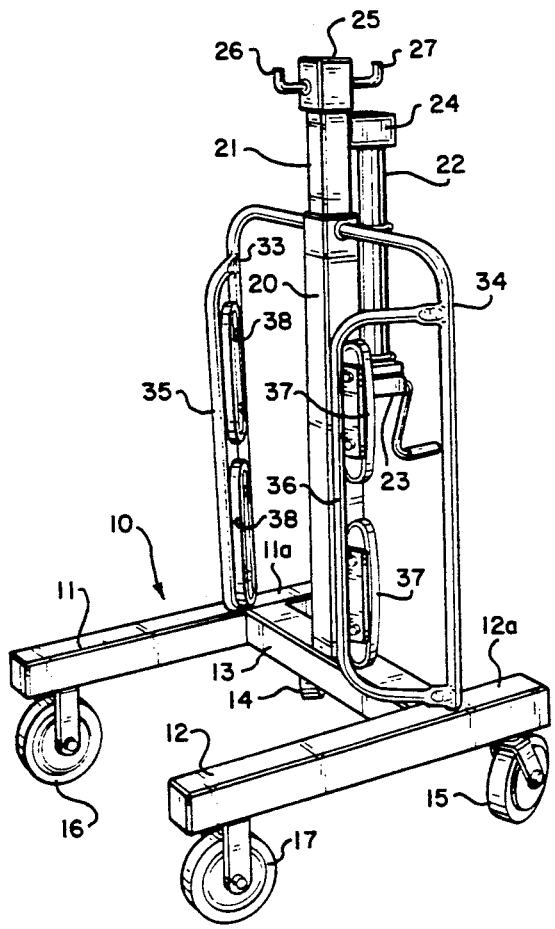
FIG. 1 is an isometric view of a first embodiment of a lift for raising large cylindrical tanks in accordance with the present invention.

Referring to FIGS. 1 through 4, an H-shaped base 10 has four wheels 14 through 17, one wheel at each end of two parallel beams 11, and a cross beam 13 closer to one pair of wheels other pair of wheels 16, 17, thus leaving a rectangular U-shaped part of the base supported at the open end by wheels 16, 17, and at the other end where parts 11a and 12a of the parallel beams 11 and 12 extend rearwardly a short distance so that the lift cannot be easily tilted back on the wheels 14 and 15. Once the lift has raised a cylinder off of the floor or a cart, the weight of the cylinder forward of the cross beam will make it virtually impossible for a human operator to tile the lift back on its rear wheels. To do so would be dangerous, as in the case of a 2-wheel hand truck. With all four wheels on the floor, the lift is very stable. It can be used as a hand truck to transport a cylinder just as a 4-wheel cart is used.

Each of the forward pair of wheels 16, 17 is preferably rigidly secured to the end of an arm of the U-shaped part of the base with its axis transversely perpendicular to the arm of the U-shaped part, while each of the pair of wheels 14, 15 at the ends of rearwardly protruding short parts 11a and 12a of the H-shaped base 10 are pivotally secured wheels (casters) for steering the lift as it is pushed from the rear, i.e., from a position between the short parts 11a and 12a, while using the lift as a 4-wheel hand truck or cart.

Figure 2:
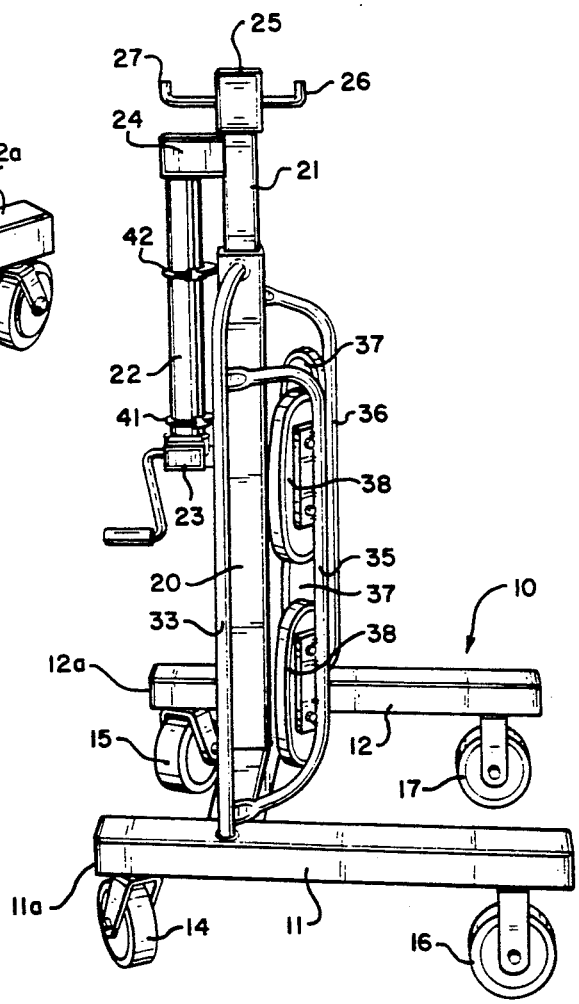
FIG. 2 is an isometric view from the side of the lift shown in FIG. 1.

An upright box beam 20 secured to the center of the cross beam 13 has a telescoping box beam 21 inserted into it, and a hand-operated worm-gear (or hydraulic) jack 22 has one end secured to a seat 23 affixed to the upright beam 21 as shown in FIG. 2. The other end of the jack 22 is secured to a plate 24 affixed to the telescoping beam 21. Operating the jack will thus raise or lower the telescoping beam 21 in the upright beam 20.

At the upper end of the telescoping beam 21 there is a cap 25 loosely fitted over the beam 21. The cap is formed by closing one end of a section of box beam of the same dimensions as the upright beam 20. That end is closed by a welded plate at its upper end. At least one hook 26 is welded to one side of the cap, but preferably a second hook 27 that protrudes further is welded to an opposite side of the cap. Two additional hooks of different lengths could be welded to the remaining sides of the cap. By lifting the cap 25 off of the upright box beam 20, a different length of hook can be selected by simply turning the cap before it is replaced on the upright beam. In that way, the proper length of rod is selected that best reaches an eye of a strap welded to a cylinder that is to be raised.

Figure 5:
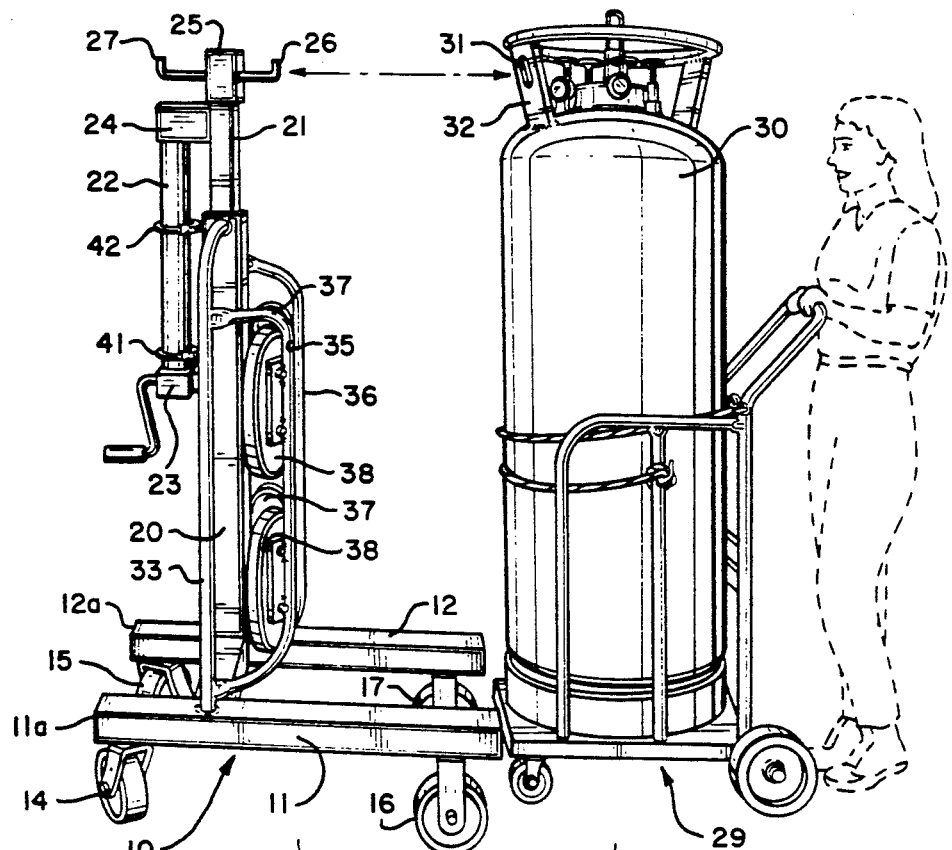
FIG. 5 is an isometric view from the side showing a cart with a cylindrical tank being wheeled into or out of a position between parallel arms of a U-shaped part of a base of the lift shown in FIG. 1 for the purpose of raising the tank off of the cart, possibly for the purpose of then lowering it onto the floor, or alternatively for the purpose of transporting the cylindrical tank on the lift to another location.

When the lift is rolled on its four wheels up to a cylindrical tank 30 standing on the floor (or on a cart or dolly 29 as shown in FIG. 5), the protruding hook selected is passed through an eye 31 of a strap 32 secured at the top of the cylindrical tank. Manually operating the jack 22 raises the telescoping beam 21 in the upright box beam 20, thus raising the cylindrical tank.

Figure 6:
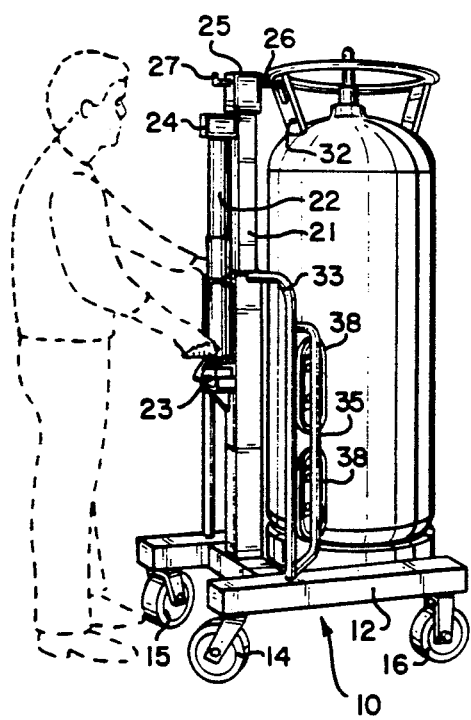
FIG. 6 illustrates a cylindrical tank raised by the lift of FIG. 1 being lowered toward the floor after moving the tank to a new location.

Since the strap 32 on a cylinder is off center, as shown in FIGS. 5 and 6, the base of the cylinder will swing in against the upright box beam 20. In order to assure that the cylindrical tank will ride up smoothly, and not drag on the upright box beam 20, struts 33, 34 are provided. The struts extend horizontally from the top of the upright box beam 20 out a short distance to the parallel box beams 11, 12 and down vertically to those box beams in a plane generally defined by the center lines of upright beam 20 and the cross beam 13.

Figure 7:
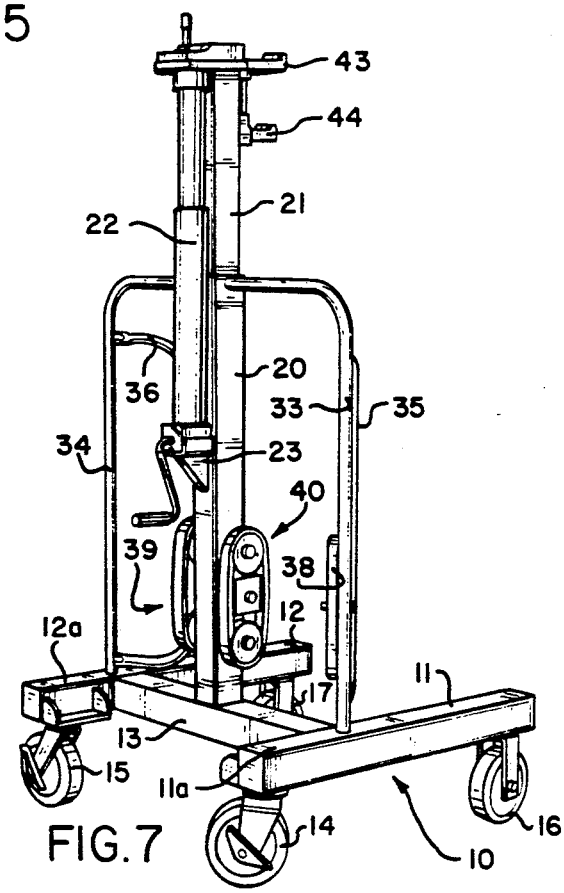
FIG. 7 illustrates variations in the first embodiment of FIG. 1. Other variations and embodiments will occur to those skilled in the art within the scope of this invention.
Figure 5:
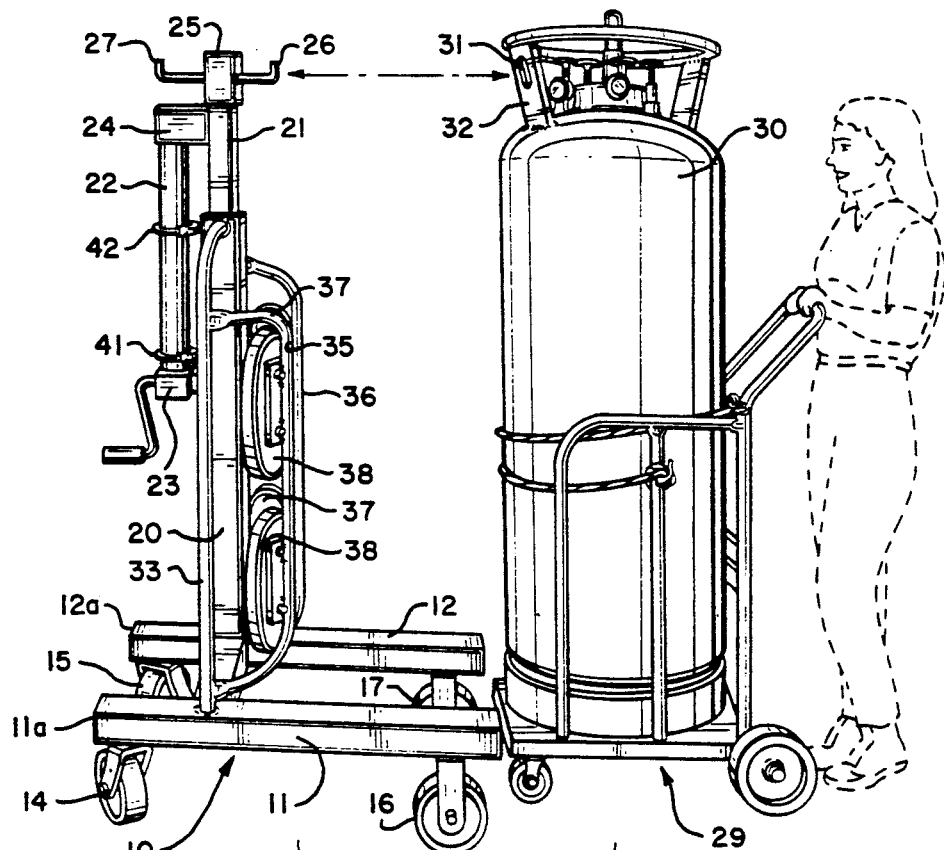
Figure 6:
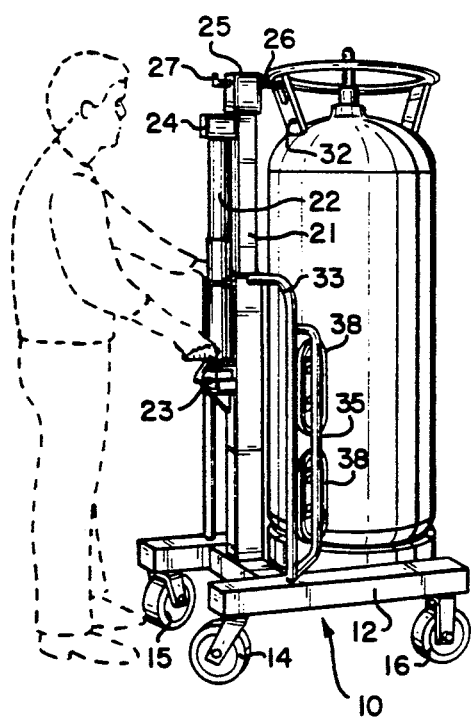
Figure 7:
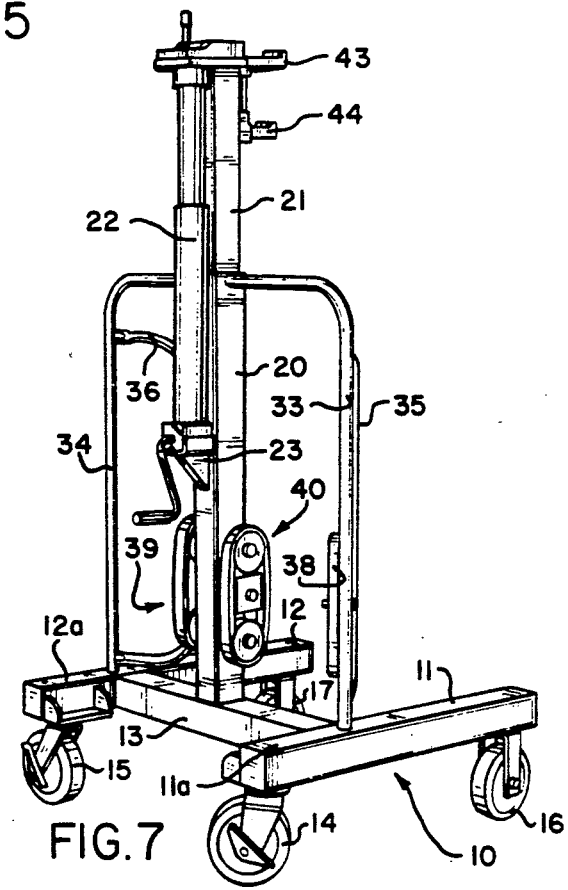

The struts 33, 34 have mounted on them respective bumper rods 35, 36 which extend out from the vertical portion of each strut toward the cylindrical tank in planes that approximately bisect the right angles between the box beams 11, 12 of the base and the cross beam 13 sufficiently to maintain the cylinder 30 in a substantially vertical orientation while it is being raised or lowered, or even while the lift is being used as a 4-wheel hand truck to transport the cylinder. So that the base of the cylindrical tank 30 will not drag on the bumper rods, at least one pair of pulley assemblies 37, 38 is mounted on each rod with a belt around the pulleys, such as is disclosed in U.S. Pat. No. 4,290,618. Even a single pulley may be used with a small V-belt stretched over it, or the equivalent on wheel with a solid rubber tire. As the tank is raised or lowered, it rests against the V-belts and moves the V-belts, thus turning the pulley or pulleys or the equivalent wheels with rubber tires. One or two sets of such bumper means having peripheral resilient material can also, or alternatively, be mounted on the upright box beam 20. One set 39, 40 of such bumper means is shown in FIG. 7 mounted on the upright beam 20 and protruding toward the cylindrical tank. The bumper means on the upright beam 20 functions in substantially the same way for the same purpose as bumper means on the bumper rods 33, 34.

Two rings 40 and 41 welded to the upright box beam 20 are shown in FIG. 2 around the jack 22 to maintain it upright on the seat 23, but that has been found to be unnecessary, as shown in FIG. 7. It has also been found unnecessary to provide more than one pair of bumper means 37, 38 on bumper rods 35, 36 secured to struts 33, 34 with or without one pair of bumper means 39, 40 on the upright box beam 20, as shown in FIG. 7. In addition, it has been found that two horizontal rods 43, 44 of different lengths welded on the upper end of the telescoping beam 21 may serve the same function in substantially the same way as the two hooks 26 and 27 welded onto a cap 25 in FIGS. 1–6 if they are turned up slightly at their ends (or provided with nibs at their free ends) so that the cylinder will not fall off the ends. One of the two rods is, of course, selected for raising a cylinder, whichever of the two has the necessary and sufficient length. Other modifications and variations may readily occur to those skilled in the art. Consequently, it is intended that the claims be interpreted to cover such modifications and variations.

What is claimed is:

1. A lift on a base having four wheels for raising a cylindrical tank having a vertical axis of the type having at least one upwardly extending strap secured to an upper end thereof offset from said vertical axis, said strap having an eye for receiving a hook or rod, comprising two parallel beams, each beam having a wheel at each end, and a cross beam between said parallel beams and perpendicular thereto at a position closer to one pair of wheels than to the other pair of wheels, thereby forming an H-shaped base and leaving a forward major open part of said two parallel beams to straddle said cylindrical tank and a rearward minor part to prevent said lift from tipping backward while transporting said cylindrical tank, an upright hollow beam secured to said cross beam at the center thereof, and a telescoping beam inserted into said hollow beam, a jack oriented to extend said telescoping beam, said jack having one end secured to said upright beam and the other end secured to said telescoping beam, whereby operation of said jack extends said telescoping beam in said hollow beam for raising a cylindrical tank and contracts said telescoping beam for lowering said cylindrical tank, a hook or rod protruding horizontally from an upper end of said telescoping beam in a vertical plane between said two parallel beams, said hook or rod being adapted to engage said eye in said upwardly extending strap secured to said upper end of said cylindrical tank, a pair of struts, one on each side of said upright hollow beam, each strut extending out horizontally from said upright hollow beam and then down vertically to a parallel beam on each side of said H-shaped base, and a pair of bumper rods extending from a vertical portion of each of said struts approximately toward said vertical axis of said cylindrical tank, each bumper rod being positioned in a plane that approximately bisects the right angle between one of said two parallel beams and said cross beam, thereby extending approximately toward said vertical axis of said cylindrical tank, whereby the bottom of said cylindrical tank is prevented from swinging into said hollow upright beam and from rolling to one side or the other as said cylindrical tank is raised or lowered, and from rolling to one side or the other as said lift on said base having four wheels is rolled to transport said cylindrical tank while said cylindrical tank is in a raised position, whereby upon inserting said hook or rod into said eye in said strap secured to an upper end of said cylindrical tank and operating said jack to extend said telescoping beam, said cylindrical tank is raised, and having been raised, said cylindrical tank may be lowered by operating said jack oppositely.

2. A lift as defined in claim 1 including rotatable means with resilient material on the periphery thereof mounted on each bumper rod in a position for engaging said cylindrical tank with said resilient material, thereby preventing said cylindrical tank from dragging on said bumper rods as said tank is raised or lowered.

3. A lift as defined in claim 2 including rotatable means with resilient material on the periphery thereof on each side of said upright hollow beam, each rotatable means being oriented to rotate about an axis parallel to said cross beam and being positioned for the resilient material thereof to protrude past said upright hollow beam to a point in space for engaging said cylindrical tank with said resilient material, thereby preventing said cylindrical tank from dragging on said hollow upright beam as it is raised or lowered in a nearly upright position.

4. A lift on a base having four wheels for raising an upright cylindrical tank of the type having at least one upwardly extending strap secured to an upper end thereof, said strap having an eye for receiving a hook or rod, comprising two parallel beams, each beam having a wheel at each end, and a cross beam between said parallel beams and perpendicular thereto at a position closer to one pair of wheels than to the other pair of wheels, thereby forming an H-shaped base and leaving a part of said two parallel beams to straddle said cylindrical tank, an upright hollow beam secured to said cross beam at the center thereof, and a telescoping beam inserted into said hollow beam, a jack oriented to raise a heavy object upwardly, said jack having one end secured to said upright beam and the other end secured to said telescoping beam, whereby operation of said jack slides said telescoping beam in said hollow beam outward for raising a heavy object and inward for lowering said heavy object, a hook or rod protruding from an upper end of said telescoping beam in a vertical plane between said two parallel beams, said hook or rod being adapted to engage said eye in said upwardly extending strap secured to said upper end of said upright cylindrical tank, rotatable means with resilient material on the periphery thereof on each side of said upright hollow beam, each rotatable means being oriented to rotate about a horizontal axis parallel to said cross beam and being positioned for the resilient material thereof to protrude to a point in space for engaging said cylindrical tank with said resilient material, thereby preventing said cylindrical tank from dragging on said hollow upright beam as it is raised or lowered in a substantially vertical orientation, whereby upon inserting said hook or rod into said eye in said strap secured to an upper end of said tank and operating said jack to raise a heavy object, said cylindrical tank is raised, and having been raised, is lowered by operating said jack oppositely.

* * * * *